US010080457B2

(12) United States Patent
Llopis

(10) Patent No.: US 10,080,457 B2
(45) Date of Patent: Sep. 25, 2018

(54) MACHINE FOR MAKING AND DISPENSING COFFEE-BASED BEVERAGES

(71) Applicant: SANREMO COFFEE MACHINES SRL, Frazione Vascon (IT)

(72) Inventor: Francesco Daniele Llopis, Cecima (IT)

(73) Assignee: SAN REMO—S.R.L., Carbonera, Frazione Vascon (IT)

( * ) Notice: Subject to any disclaimer, the term of this patent is extended or adjusted under 35 U.S.C. 154(b) by 0 days.

(21) Appl. No.: 15/030,335

(22) PCT Filed: Aug. 26, 2014

(86) PCT No.: PCT/EP2014/068104
§ 371 (c)(1),
(2) Date: Apr. 18, 2016

(87) PCT Pub. No.: WO2015/055343
PCT Pub. Date: Apr. 23, 2015

(65) Prior Publication Data
US 2016/0249761 A1   Sep. 1, 2016

(30) Foreign Application Priority Data
Oct. 18, 2013 (IT) ............................. TV2013A0173

(51) Int. Cl.
*A47J 31/34* (2006.01)
*A47J 31/54* (2006.01)
(Continued)

(52) U.S. Cl.
CPC ......... *A47J 31/002* (2013.01); *A47J 31/0576* (2013.01); *A47J 31/0657* (2013.01);
(Continued)

(58) Field of Classification Search
CPC .. A47J 31/002; A47J 31/0576; A47J 31/0657; A47J 31/0663; A47J 31/34; A47J 31/30; A47J 31/3671; A47J 31/52
(Continued)

(56) References Cited

U.S. PATENT DOCUMENTS 6,067,894 A * 5/2000 Eugster ................ A47J 31/404
99/280
6,148,717 A * 11/2000 Lassota ................ A47J 31/002
222/1

(Continued)

FOREIGN PATENT DOCUMENTS

| WO | 2010076264 A1 | 7/2010 |
| WO | 2010125329 A1 | 11/2010 |
| WO | 2011151703 A2 | 12/2011 |

OTHER PUBLICATIONS

International Search Report dated Jan. 5, 2015 re: Application No. PCT/EP2014/068104; pp. 1-3.
(Continued)

*Primary Examiner* — Reginald L Alexander
(74) *Attorney, Agent, or Firm* — Cantor Colburn LLP

(57) ABSTRACT

An espresso coffee dispensing machine includes a preheating boiler with temperature control, at least one hydraulic pump, and at least one dispensing assembly with systems for heating and temperature control of the water. The machine includes at least one balance for weighing the ground coffee in a filter and the dispensed product. Manual or electronic components for controlling the thermal power delivered within the preheating boiler and by the dispensing assembly are also included in the dispensing machine. The machine performs, following a rise in the temperature of the water, a pre-infusion and a post-infusion at constant pressure and for a preset volume of water calculated via a volumetric meter. Between pre-infusion and post-infusion, a brewing or infusion at constant pressure occurs wherein a presettable water
(Continued)

volume is dispensed following calculation of the weight of the ground coffee in the filter and the product dispensed according to a brew ratio.

9 Claims, 2 Drawing Sheets

(51) Int. Cl.
| | | |
|---|---|---|
| *A47J 31/52* | (2006.01) | |
| *A47J 31/00* | (2006.01) | |
| *A47J 31/057* | (2006.01) | |
| *A47J 31/38* | (2006.01) | |
| *A47J 31/44* | (2006.01) | |
| *A47J 31/36* | (2006.01) | |
| *A47J 31/56* | (2006.01) | |
| *A47J 31/06* | (2006.01) | |

(52) U.S. Cl.
CPC ........... *A47J 31/3671* (2013.01); *A47J 31/38* (2013.01); *A47J 31/44* (2013.01); *A47J 31/56* (2013.01); *A47J 31/0663* (2013.01); *A47J 31/34* (2013.01)

(58) Field of Classification Search
USPC ............... 99/302 R, 300, 282, 281, 283, 305
See application file for complete search history.

(56) References Cited

U.S. PATENT DOCUMENTS

| | | | | |
|---|---|---|---|---|
| 7,578,230 B2* | 8/2009 | Rahn | ....................... | A47J 31/36 |
| | | | | 99/281 |
| 7,814,824 B2* | 10/2010 | Beretta | .................... | A47J 31/46 |
| | | | | 426/433 |
| 8,453,560 B2* | 6/2013 | Coccia | .................. | A47J 31/465 |
| | | | | 99/281 |
| 8,739,687 B1* | 6/2014 | Tacklind | ................. | A47J 31/42 |
| | | | | 99/280 |
| 8,850,961 B2* | 10/2014 | Hidding | .............. | A47J 31/4475 |
| | | | | 99/299 |
| 2006/0042470 A1* | 3/2006 | Anson | ..................... | A47J 31/46 |
| | | | | 99/275 |
| 2015/0250354 A1* | 9/2015 | Ceotto | .................... | A47J 31/42 |
| | | | | 99/281 |

OTHER PUBLICATIONS

Written Opinion dated Jan. 5, 2015 re: Application No. PCT/EP2014/068104; pp. 1-5.

* cited by examiner

* AMOUNT OF WATER DISPENSED AT CONSTANT PRESSURE

MACHINE FOR MAKING AND DISPENSING COFFEE-BASED BEVERAGES

TECHNICAL FIELD

The present disclosure relates to a machine for making and dispensing coffee-based beverages.

BACKGROUND

Machines for making and dispensing coffee-based beverages, particularly for the professional sector, such as bars, restaurants, hotels and catering, are currently known.

They comprise substantially a grinder for coffee beans, a boiler, a pump, an assembly for dispensing hot water with which it is possible to associate in a downward region a filter in which the ground coffee is placed and pressed.

Therefore, once the coffee has been ground, it is pressed in the filter basket holder, which in turn is coupled to the dispensing assembly, and then the pump that dispenses the hot water is activated, thus obtaining the infusion.

The resulting coffee can vary in its organoleptic characteristics as a function, for example, of the amount of ground coffee used, of the degree of grinding, of the extent of the pressure used, of the time in which the water is dispensed.

Italian patents no. 1396581 and no. 1396582, both filed on 23 Oct. 2009, relate to a method for controlling the dispensing pressure in a coffee machine in order to produce and dispense coffee-based beverages; U.S. Pat. No. 1,396,581 comprises a filter unit that is adapted to contain coffee powder, the method comprising:

supplying a preset quantity of water from a hydraulic pump with a flow-rate that corresponds to at least one nominal dispensing pressure value to a hydraulic circuit that has a fluid connection to the hydraulic pump and to the dispensing assembly, the hydraulic pump being actuatable by means of an electronic control device;

detecting at least one water dispensing pressure value by means of a pressure sensor arranged along the hydraulic circuit, and if the at least one detected value of the dispensing pressure differs from the at least one nominal pressure value, adjusting the flow-rate of the water dispensed by the pump as a function of the at least one detected dispensing pressure value.

Italian Patent no. 1396582 differs in that it includes at least one dispenser which comprises a filter unit adapted to contain coffee powder, the method comprising:

supplying water to a hydraulic circuit that has fluid connection to the at least one dispenser and comprises a valve with adjustable flow-rate adapted to emit variable quantities of water to the at least one dispenser;

emitting from the adjustable flow-rate valve a preset quantity of water that corresponds to at least one nominal dispensing pressure value, the valve with adjustable flow-rate being actuatable by means of an electronic control device that controls the flow-rate of water in output from the valve;

detecting at least one water dispensing pressure value by means of a pressure sensor arranged along the hydraulic circuit, and if the at least one detected value of the dispensing pressure differs from the at least one nominal pressure value, adjusting the flow-rate of the water emitted by the adjustable flow-rate valve as a function of the at least one detected pressure value.

Such solutions are based specifically on control and adjustment of the dispensing pressure.

However, such methodology has the drawback of requiring a continuous control and modification of the pressure and a structural complexity that entails the use of expensive components, all this increasing the overall cost of the machine.

Moreover, it is not possible to keep the result in the cup constant because it is subject to a continuously variable choice on the pressure that can be made by the operator.

Patent Application no. WO2012146641 relates to an espresso coffee machine, the device comprising a weighing platform that can be located in the tray region of the espresso coffee machine below a dispensing assembly, a controller connected to the weighing platform, a start/stop button, a timer unit and a display, all of which are connected to a control unit, such that during use the weight of a dispensing and the time required to dispense it are measured by means of the weighing platform and the timer unit, respectively, and the results are shown on a display.

This solution, too, has drawbacks, since it is considered insufficient to weigh the ground coffee and determine the water dispensing time in order to obtain an optimum infusion, and moreover the operator must in any case decide, on the basis of the indications that are present on the display, when to interrupt the dispensing of the water.

Moreover, it is still not possible to keep constant the result in the cup.

SUMMARY

The aim of the present disclosure is therefore to solve the described technical problems, by eliminating the drawbacks of the cited background art and thus devising a machine for dispensing a coffee-based beverage that allows to obtain an optimum infusion and allows the infusion to be repeatable over time as well as straightforward and easy to obtain by the operator.

Within this aim, the disclosure provides a machine that allows to dispense an infusion that has constant organoleptic characteristics over time.

The disclosure further provides a machine that allows to keep constant the result in the cup once a specific parameter has been determined by the user.

This aim and others that will become better apparent hereinafter are achieved by a machine for dispensing espresso coffee comprising a preheating boiler with temperature control, at least one hydraulic pump, at least one dispensing assembly provided with systems for further heating and temperature control of the water, at least one balance that weighs the amount of ground coffee in a filter and of the dispensed product, and manual or electronic means for controlling both the thermal power delivered within said preheating boiler and the thermal power delivered by said dispensing assembly, characterized in that said machine performs, following a rise in the temperature of the water, a pre-infusion and a post-infusion at constant pressure and for a preset volume of water calculated by means of a volumetric meter, between said pre-infusion and said post-infusion there being performed a brewing or infusion at constant pressure, in which a presettable volume of water is dispensed following the calculation of the weight of the ground coffee in said filter and of the product dispensed according to a selected and preset brew ratio.

BRIEF DESCRIPTION OF THE DRAWINGS

Further characteristics and advantages of the disclosure will become better apparent from the detailed description of a particular but not exclusive embodiment, illustrated by way of non-limiting example in the accompanying drawings, wherein.

Figure 1:
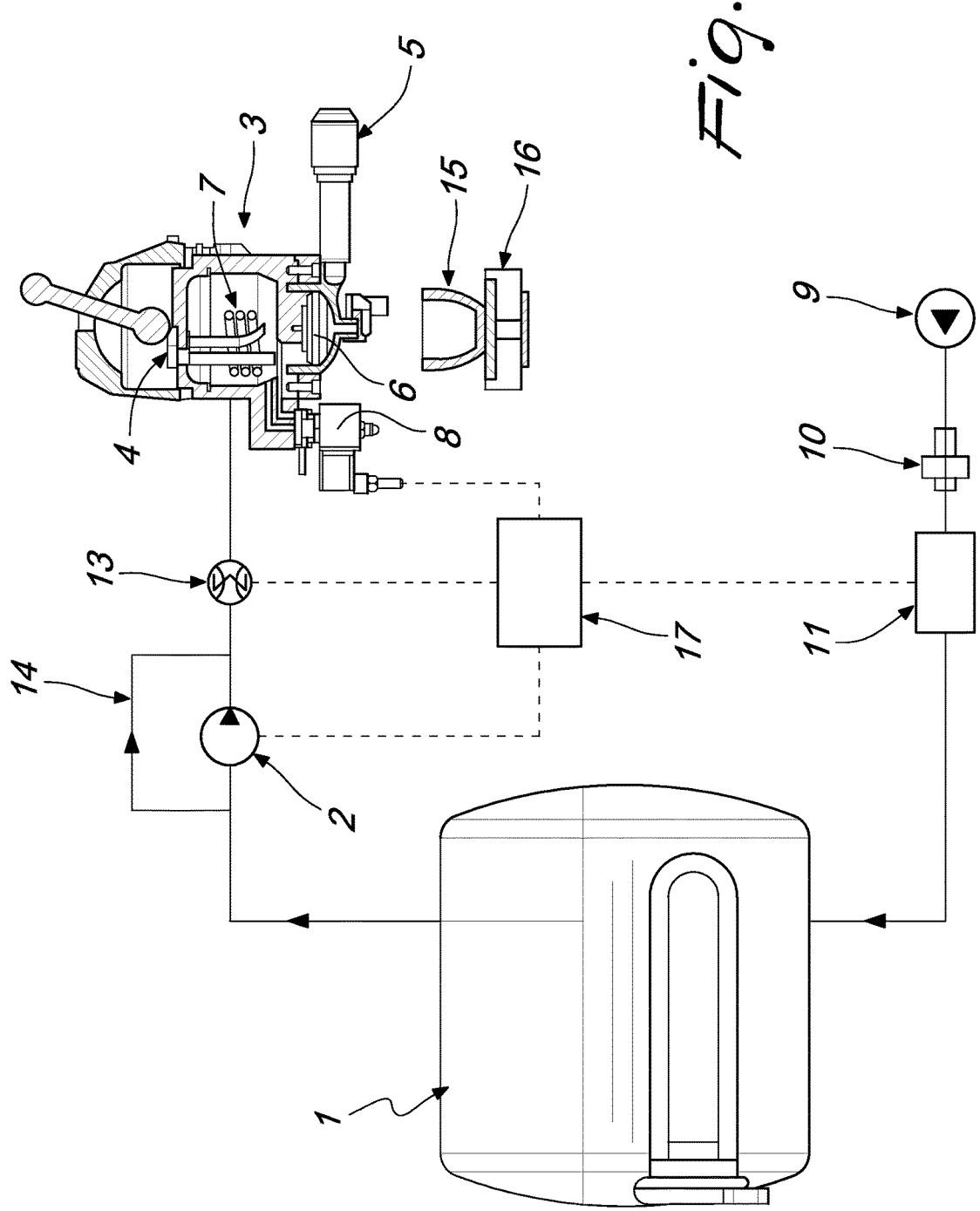
FIG. 1 is a schematic view of the machine.
Figure 2:
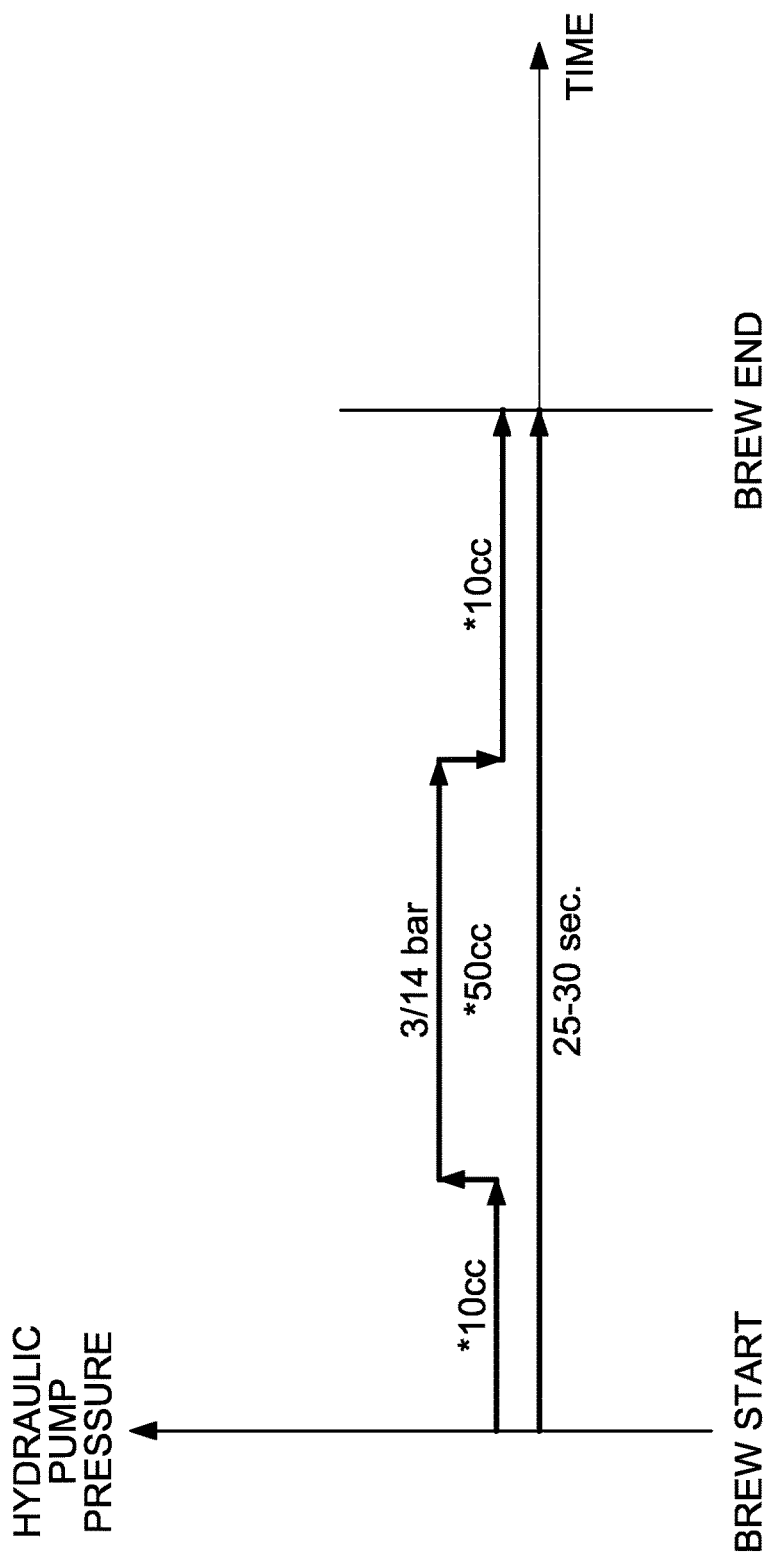
FIG. 2 is a pressure chart.

In the exemplary embodiments that follow, individual characteristics, given in relation to specific examples, may actually be interchanged with other different characteristics that exist in other exemplary embodiments.

DETAILED DESCRIPTION OF THE DRAWINGS

With reference to the figures, the machine for dispensing espresso coffee comprising a preheating boiler 1 with temperature control, a hydraulic pump 2, a dispensing assembly 3 provided with means 4, such as a sensor, for temperature control, with a filter basket holder 5 provided with a filter 6 on which ground coffee is pressed, with a resistance header 7, and with an electric valve 8.

The hydraulic pump 2 ensures the dispensing of a constant pressure during all the various water dispensing steps, said dispensing being programmable (for example up to 14 bar) according to a quantity required to dispense a cup of espresso coffee in a set time.

Advantageously, the preheating boiler 1 is fed by means of the water mains 9 with the interposition of a filter 10 and of a block 11 that is intended to distribute the mains water in the two coffee/steam water circuits.

Moreover, the boiler 1 is interconnected to the dispensing assembly 3 by means of the interposition of a volumetric meter 13, while the hydraulic pump 2 can be bypassed by means of a duct 14 that connects the boiler 1 directly to the dispensing assembly 3.

There are also manual or electronic means for controlling both the thermal power dispensed within the preheating boiler 1 and the thermal power dispensed by the dispensing assembly 3, and means adapted to weigh the ground coffee in the filter basket holder 5 and the weight of the product dispensed in a cup 15, such as a balance 16.

There is, furthermore, a centralized logic unit 17 that is connected to the hydraulic pump 2, to the volumetric meter 13, to the block 11 and to the electric valve 8.

The machine provides initially for an increase in the temperature of the water, inside the preheating boiler 1 and inside the dispensing assembly 3, in order to achieve a preheating of the water with reading of the associated temperature, by means of the sensor 4, in order to adjust the delivered thermal power; this allows to enhance the aromas of the ground coffee in the filter basket holder 5.

The machine then performs a pre-infusion by dispensing preheated water in a preset time or for a preset volume of water in the absence of pressure in the hydraulic pump 2, wherein the coffee powder, contained in the filter basket holder 5, is only wet.

This pre-infusion allows to improve the brewing of the coffee.

Upon dispensing, the ground coffee is imbibed with water at the correct temperature without pressure of the hydraulic pump 2 for a few seconds.

This allows to increase the volume of the ground coffee and to improve the flow of subsequent water under pressure without creating preferential pathways.

After pre-infusion, the machine performs a brewing or infusion at constant pressure, in which a presettable volume of water is dispensed following the calculation of the weight of the ground coffee in the filter 6 and of the product dispensed in the cup 15 according to a selected and preset brew ratio.

The machine therefore allows to dispense, by using the centralized logic unit 17 that manages the volume of water dispensed by means of the volumetric meter 13 and at a preset and constant pressure as a function of the weight of the ground coffee and of the dispensed product, an amount of water by volume that is calculated to achieve a selected brew ratio.

Such brew ratio can be outlined according to the following table:

| Ground coffee weight Powder in grams | Weight of dispensed product Liquid in grams | 40% brew ratio Volume of hot water in cc | 50% brew ratio Volume of hot water in cc | 60% brew ratio Volume of hot water in cc |
| --- | --- | --- | --- | --- |
| 14 | 28 | 63.3 | 50.6 | 42.2 |
| 15 | 30 | 67.9 | 54.3 | 45.3 |
| 16 | 32 | 72.5 | 58.0 | 48.3 |
| 17 | 34 | 77.1 | 61.7 | 51.4 |
| 18 | 36 | 81.8 | 65.4 | 54.5 |
| 19 | 38 | 86.4 | 69.1 | 57.6 |
| 20 | 40 | 91.0 | 72.8 | 60.7 |
| 21 | 42 | 95.6 | 76.5 | 63.8 |

The machine then performs a post-infusion at constant pressure and for a preset volume of water, calculated by means of the volumetric meter 13, in which the hydraulic pump 2 is deactivated again for a time needed to reach by weight the programmed dose of dispensed product.

Water dispensing by means of the hydraulic pump 2 always occurs at a constant pressure according to the following chart, shown calculating for example a hypothetical dose of 70 cc and an overall time between 25 and 30 seconds:

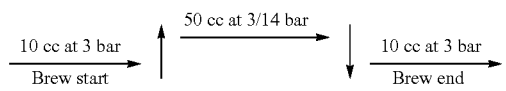

As an alternative, the dispensing or infusion step can occur at a constant pressure comprised between 3 and 14 bar.

The machine therefore allows to set the pre-infusion, brewing or infusion and post-infusion steps, establishing how many cc of hot water are needed for the various steps and in how many seconds they must be dispensed.

Assuming a dispensing start time and a dispensing end time preferably for a total of 25-30 seconds, the volumetric meter reads how many cc per tenth of a second are flowing beyond the coffee powder in the filter and whether they are higher or lower than the parameters set by reading the weight of the brewed coffee in the cup arranged on the balance, and then adjusts the flow-rate by sending a command to the centralized logic unit 17, which changes the amount of water dispensed.

The machine allows, by controlling the quantity by volume of water calculated to achieve a desired brew ratio, to enhance the extraction of the aromas and all the organoleptic qualities during the dispensing of the espresso coffee, once the weight of the coffee in the cup 15 has been measured with respect to the weight of the coffee powder contained in the filter basket holder 5.

In the brewing or infusion step, the ground coffee, previously imbibed with water heated to the optimum temperature without pressure of the hydraulic pump 2 for a few seconds, is then struck by the hot water under pressure at a preset constant value: this allows to increase the extraction of water-soluble substances present in the coffee and to make them remain for a shorter time at high temperatures, which, as in the case of protein, would cause their denaturation, with consequent loss of their structure, which is essential in the formation of cream.

Also in the brewing or infusion step, in which water at constant temperature and pressure passes through the layer of coffee powder contained in the filter basket holder 5, an emulsion of the oils extracted in the preceding step is obtained, by means of which the beverage assumes the creamy appearance that distinguishes it, so as to enhance its body and acidity.

In the post-infusion step, the hydraulic pump 2 is disengaged and extraction continues for a programmed time or dose in cc; the bitter notes are enhanced in this step.

As regards control of the quantity by volume of water calculated to obtain a desired brew ratio, it is obtained by measuring the weight of the coffee, which must have a correct grinding and a pressing level equal to approximately 22 kg, arranged in the filter basket holder 5, and the weight of the dispensed product; in order to achieve this, there is the balance 16, which is arranged below the dispensing assembly 3 and communicates with the centralized logic unit 17; by reading the data sent by the balance 16, the desired brew ratio is established; for example, with 15 g of powdered coffee and 30 g of espresso coffee dispensed, the volume of water needed to have a brew ratio equal to 40% is equal to 67.9 cc of hot water on the coffee, while at 50% it is equal to 54.3 cc and at 60% it is equal to 45.3 cc.

By means of the centralized logic unit or CPU 17 it is possible to manage the volume of water dispensed with the control of the volumetric meter 13; software is used which comprises a data table such as the one shown previously and these data can also be changed during programming by the user in order to improve and personalize the brew ratio.

It has thus been found that the disclosure provides a machine which achieves optimum infusion, which is repeatable over time and straightforward to obtain on the part of the operator, and also has organoleptic characteristics that are constant over time.

When the parameters of the brew ratio are set, the result in the cup is in fact constant for each dispensing.

Moreover, such machine allows to check the result in the cup directly for example by reading the brew ratio shown on an adapted display located for example in front of the operator and allows to manage the best extraction by means of a series of parameters that are already set as default in the software and allow to have perfect and constant espresso coffee brews.

This is possible also thanks to the use of the balance or load cell 16 arranged below the dispensing assembly 3, which communicates with the centralized logic unit or CPU 17 and allows to manage different yield percentages with the same quantity of ground coffee placed in the filter basket holder 5.

The materials used, as well as the dimensions that constitute the individual components of the disclosure, may of course be more pertinent according to the specific requirements.

The characteristics indicated as advantageous, convenient or the like may also be omitted or be replaced with equivalents.

The disclosures in Italian Patent Application No. TV2013A000173 from which this application claims priority are incorporated herein by reference.

The invention claimed is:

1. An espresso coffee dispensing machine, comprising a preheating boiler with temperature control, at least one hydraulic pump, at least one dispensing assembly interconnected to the boiler by a volumetric meter, said at least one dispensing assembly provided with systems for heating and temperature control of the water, at least one balance that weighs first amount of ground coffee in a filter and a second amount of a product dispensed in a cup, and manual or electronic means for controlling both the thermal power delivered within said preheating boiler and the thermal power delivered by said dispensing assembly, wherein said machine performs, following a rise in the temperature of the water, a pre-infusion and a post-infusion at constant pressure and for a preset volume of water calculated by means of the volumetric meter, between said pre-infusion and said post-infusion there being performed a brewing or infusion at constant pressure, in which a presettable volume of water is dispensed following the calculation of the weight of the ground coffee in said filter and of the product dispensed according to a selected and preset brew ratio.

2. The machine according to claim 1, wherein initially the machine raises the temperature of the water, within said preheating boiler and within said dispensing assembly, to achieve a preheating of the water with reading of the corresponding temperature by means of a sensor in order to adjust the delivered thermal power.

3. The machine according to claim 1, performing said pre-infusion by means of the dispensing of water at optimum temperature in a preset time or for a preset volume of water in the absence of pressure in said hydraulic pump, wherein the coffee powder contained in said filter basket holder is only wet, said pre-infusion allowing to improve coffee brewing.

4. The machine according to claim 1, performing, after said pre-infusion, said brewing or infusion at constant pressure, in which a presettable volume of water is dispensed following the calculation of the weight of the ground coffee in said filter and of the product dispensed in the cup according to a selected and preset brew ratio.

5. The machine according to claim 1, wherein said brewing or infusion allows to dispense, by using a centralized logic unit that manages a volume of water dispensed by means of said volumetric meter and at a preset and constant pressure as a function of the weight of the coffee ground in said filter and of the product dispensed in said cup, a quantity by volume of water that is calculated to achieve a selected brew ratio.

6. The machine according to claim 1, performing said post-infusion at constant pressure and for a preset volume of water calculated by means of said volumetric meter, in which said hydraulic pump is again deactivated for a time needed to reach by weight the programmed dose of product dispensed in said cup.

7. The machine according to claim 1, wherein said post-infusion the dispensing of the water by means of said hydraulic pump occurs always at constant pressure.

8. The machine according to claim 1, wherein said volumetric meter reads how many cc per tenth of a second are flowing beyond the coffee powder in said filter and, depending on whether they are higher or lower than the parameters set by reading the weight of the brewed coffee in said cup arranged on said balance, adjusts the flow-rate by sending a command to said centralized logic unit, which corrects the flow-rate by acting on said pump.

9. The machine according to claim 5, wherein said centralized logic unit allows, by means of said volumetric meter, to control the quantity by volume of water calculated to obtain a selected brew ratio by measuring the weight of the coffee in said filter and the weight of the product dispensed in said cup, the reading of said data establishing the desired brew ratio, said centralized logic unit using software that comprises a data table or data that are changed during programming by the user.

* * * * *